(12) United States Patent
Stegemeyer et al.

(10) Patent No.: US 10,876,764 B2
(45) Date of Patent: Dec. 29, 2020

(54) HEATING DEVICE AS WELL AS METHOD FOR MOUNTING A HEATING DEVICE

(71) Applicant: Robert Bosch GmbH, Stuttgart (DE)

(72) Inventors: Andreas Stegemeyer, Ludwigsburg (DE); Daniel Lindemann, Nuertingen (DE); Manfred Oehrlein, Schlierbach (DE); Marcus Wuenning, Shanghai (CN); Maximilian Beck, Stuttgart (DE); Michael Oesterie, Esslingen Am Neckar (DE); Sebastian Goerick, Moeglingen (DE); Yildirim Cantuerk, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 15/958,038

(22) Filed: Apr. 20, 2018

(65) Prior Publication Data

US 2019/0162443 A1 May 30, 2019

(30) Foreign Application Priority Data

Nov. 30, 2017 (DE) .......................... 10 2017 221 525

(51) Int. Cl.
| | |
|---|---|
| *F24H 9/02* | (2006.01) |
| *F24H 9/06* | (2006.01) |
| *F24H 9/14* | (2006.01) |
| *F24H 3/04* | (2006.01) |

(52) U.S. Cl.
CPC ............. *F24H 3/0488* (2013.01); *F24H 9/02* (2013.01); *F24H 9/06* (2013.01); *F24H 9/148* (2013.01)

(58) Field of Classification Search
CPC ..... F24H 9/02; F24H 1/00; F24H 9/06; F24H 3/0488; F24H 9/148
USPC ........................................................... 126/89
See application file for complete search history.

(56) References Cited

U.S. PATENT DOCUMENTS

| | | | |
|---|---|---|---|
| 1,842,783 A | 1/1932 | Hauser | |
| 4,313,043 A * | 1/1982 | White ................. | F24C 15/2042 126/299 D |
| 4,598,690 A * | 7/1986 | Hsu .......................... | F24C 1/16 126/25 R |
| 4,814,571 A * | 3/1989 | Bowen ................. | H05B 6/6426 126/340 |
| 5,290,575 A * | 3/1994 | Torikata ................... | A21B 2/00 219/686 |
| 5,704,699 A * | 1/1998 | Pagelow ................ | A47B 47/05 312/111 |

(Continued)

FOREIGN PATENT DOCUMENTS

| | | |
|---|---|---|
| DE | 29502871 U1 | 4/1995 |
| DE | 19754059 A1 | 6/1999 |

(Continued)

*Primary Examiner* — Edelmira Bosques
*Assistant Examiner* — Nikhil P Mashruwala
(74) *Attorney, Agent, or Firm* — Norton Rose Fulbright US LLP; Gerard Messina

(57) ABSTRACT

A heating device, in particular a gas-heating system, including a housing structure and an external housing, the external housing having at least one sidewall and at least one cover, which are able to be fixed in place on the housing structure. The at least one cover is developed to position the at least one sidewall in at least one direction in space relative to the housing structure. A method for mounting a heating device is also described.

9 Claims, 12 Drawing Sheets

(56) References Cited

U.S. PATENT DOCUMENTS

| | | | | |
|---|---|---|---|---|
| 6,038,965 | A * | 3/2000 | Thorndyke | A47J 37/0682 |
| | | | | 126/25 R |
| 8,101,894 | B2 * | 1/2012 | Lee | F24C 15/2014 |
| | | | | 126/19 R |
| 9,982,913 | B2 * | 5/2018 | Kang | F24H 3/0488 |
| 10,066,839 | B2 * | 9/2018 | Lee | F24C 15/006 |

FOREIGN PATENT DOCUMENTS

| | | |
|---|---|---|
| DE | 20113369 U1 | 10/2001 |
| DE | 10312731 A1 | 9/2004 |
| DE | 202004010968 U1 | 9/2004 |
| EP | 0341751 A2 | 11/1989 |

\* cited by examiner

HEATING DEVICE AS WELL AS METHOD FOR MOUNTING A HEATING DEVICE

CROSS REFERENCE

The present application claims the benefit under 35 U.S.C. § 119 of German Patent Application No. DE 102017221525.9 filed on Nov. 30, 2017, which is expressly incorporated herein by reference in its entirety.

FIELD

The present invention relates to a heating device, in particular a gas-heating system, which includes a housing structure and an external housing. The external housing has at least one sidewall and at least one cover, which is able to be attached to the housing structure. The present method also relates to a method for mounting a heating device.

BACKGROUND INFORMATION

A heating device including frame components and a casing is described in German Patent No. DE 201 13 369 U1, the casing having two side parts, a cover as well as a front piece, which are able to be attached to the frame parts.

SUMMARY

An example embodiment of the present invention may have the advantage that the at least one casing is designed to position the at least one sidewall in at least one direction in space relative to the housing structure so that an installation of the at least one sidewall is able to be carried out in a simpler and more precise manner.

A housing structure within the framework of the present invention in particular is to be understood as a basic design for a housing. More specifically, the housing structure is suitable for a wall mount. The housing structure preferably assumes a supporting function for the external housing. In addition, the housing structure preferably assumes a supporting function for additional components and/or units. The housing structure of the heating device in particular is capable of accommodating a heat-generating unit of the heating device. The housing structure preferably has fixedly installed components.

For example, the components of the housing structure may be mounted in a manner that makes them non-exchangeable. As a result, no provision has to be made for an exchangeability of the components of the housing structure for replacement parts.

The features described herein allow for advantageous further developments of the present invention. It is advantageous, for instance, if the housing structure includes at least one guide mechanism, and/or if the at least one sidewall includes at least one guide element, preferably at least one guide element that corresponds to the at least one guide mechanism of the housing structure, whereby a stable attachment of the at least one sidewall to the housing structure is possible.

It is particularly advantageous if the at least one sidewall is able to be mounted on the housing structure by hanging and/or insertion, preferably with the aid of the at least one guide mechanism and/or the at least one guide element. This allows for a rapid attachment of the at least one sidewall for which, in particular, no screwed connection of the at least one sidewall is necessary.

It is also advantageous if the at least one cover is attachable to the housing structure as a cover flap, preferably via at least one hinge-type connection so that an uncomplicated attachment of the at least one cover to the housing structure is possible.

It is particularly preferred if the at least one sidewall has a tab-like projection, and the at least one cover has a lug-type projection that corresponds thereto and which engages with the tab-like projection in order to position the at least one sidewall, thereby allowing for an efficient positioning of the at least one sidewall.

It is also advantageous if the external housing has at least two sidewalls and the at least one cover is designed to position the at least two sidewalls relative to each other so that the attachment of the at least two sidewalls is able to be carried out more easily and precisely.

In addition, it is advantageous if the external housing has at least one front cover, which is able to be attached to and, in particular, hooked into, the at least one cover, so that the front cover need not be directly attached to or hooked into the housing structure, which means that there is also no need to provide additional means on the housing structure for attaching the front cover.

The present invention also relates to a method for mounting a heating device, in particular a heating device according to the previous description. The present method is characterized by the following method steps:
a) Attaching at least one sidewall to a housing structure;
b) Positioning the at least one sidewall relative to the housing structure by attaching a cover, in particular by flipping a cover flap closed.

In this way a particularly easy and precise attachment of the at least one sidewall is able to be accomplished.

It is particularly advantageous if method step a) takes place by at least one of the following method steps:
a) Hanging the at least one sidewall into at least one guide mechanism of the housing structure;
b) Inserting the at least one sidewall along at least one guide mechanism, preferably the at least one guide mechanism, of the housing structure.

This allows for a particularly rapid attachment of the at least one sidewall, which especially does not require a screw connection of the at least one sidewall.

An example method in accordance with the present invention may include the following additional method step:
c) Mounting, in particular hooking, at least one front cover on or into the at least one cover.

BRIEF DESCRIPTION OF THE DRAWINGS

An exemplary embodiment of the present invention is shown in the figures and described in greater detail below.

DETAILED DESCRIPTION OF EXAMPLE EMBODIMENTS

Figure 1:
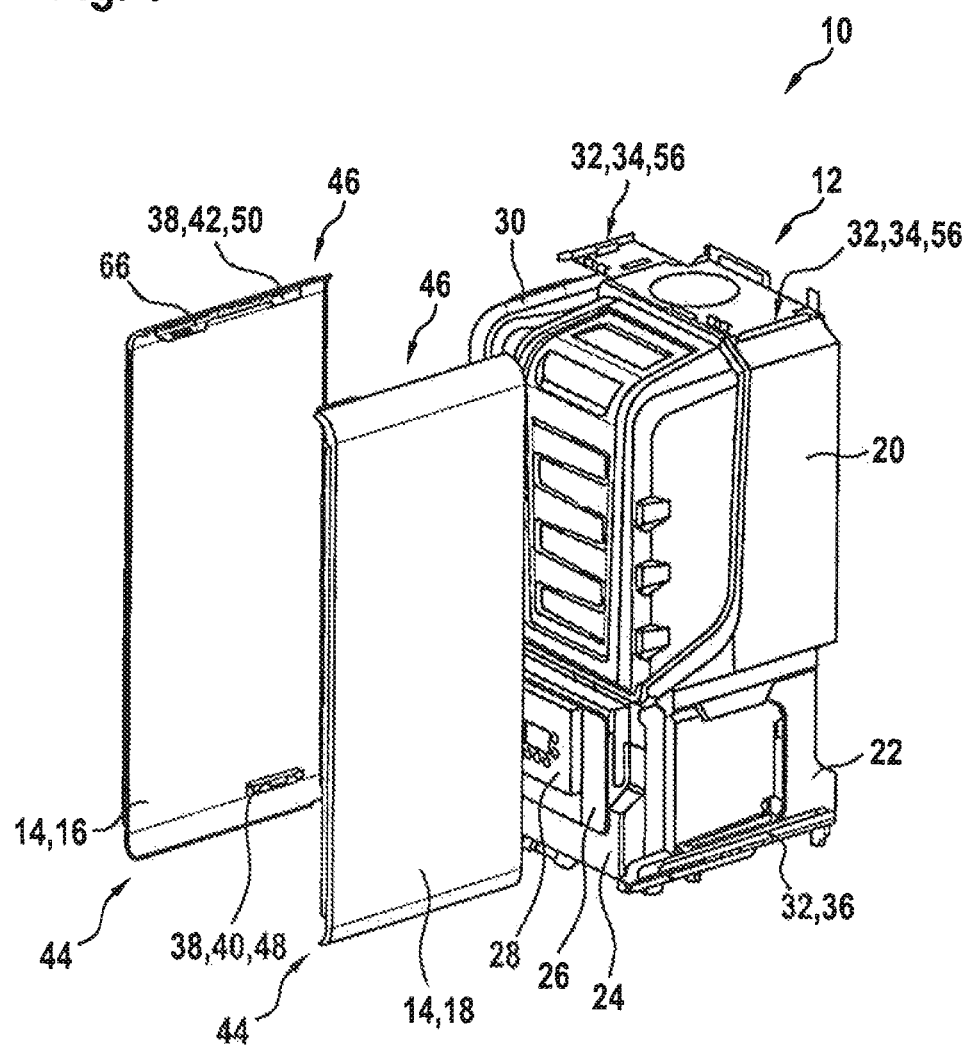
FIG. 1 shows a perspective view of a housing structure of a heating device including sidewalls.

FIG. 1 shows a perspective representation of a housing structure 12 of a heating device 10 including sidewalls 14, i.e., a first sidewall 16 and a second sidewall 18 in the illustrated case. In this representation, sidewalls 14 are not yet attached to housing structure 12. However, sidewalls 14 are meant to be attached to housing structure 12.

In the illustrated exemplary embodiment, housing structure 12 is provided for wall mounting. Housing structure 12 has a wind box 20 and structural elements 22. Structural elements 22 are characteristic components of housing structure 12 in the illustrated case. Structural elements 22 mainly have a supporting function for additional structural housing elements of housing structure 12. In the illustrated case, wind box 20 is mounted on structural elements 22. Wind box 20 is, in turn, capable of accommodating a heat-generating unit; however, this is not shown in greater detail here because wind box 20 is illustrated in the closed state.

In addition, a holding device 24 for a control unit 26 is fixed in place on housing structure 12. In the illustrated case, holding device 24 for control unit 26 is mounted on structural elements 22. Control unit 26, in turn, accommodates an operating unit 28.

Moreover, housing structure 12 accommodates a pressure-equalization vessel 30, which is disposed on one of structural elements 22 in the illustrated case.

Sidewalls 14 are able to be attached to housing structure 12. Accordingly, starting from FIG. 1, FIGS. 2 through 4 show a sequence for attaching sidewalls 14 to housing structure 12.

Housing structure 12 has guide mechanisms 32. In the illustrated case, housing structure 12 includes guide mechanisms 32 on wind box 20 and on structural elements 22. Guide mechanisms 32 on wind box 20 are guide rails 34. Guide mechanisms 32 on structural elements 22 in turn are guide grooves 36. In the illustrated case, one of guide grooves 36 is developed on one of structural elements 22 in each case.

Sidewalls 14, in turn, have guide elements 38. In the illustrated case, guide elements 38 are guide hooks 40 and guide projections 42. A separate guide hook 40 and guide projection 42 are developed on each sidewall 14. In the illustrated case, guide hook 40 is developed on each sidewall 14, in a lower region 44 of sidewall 14, while guide projections 42 are developed in an upper region 46 on each sidewall 14.

In the illustrated case, guide hooks 40 are U-shaped sheet-metal parts 48, which are welded to sidewalls 14. Guide projections 42 in turn are a shape 50 that is stamped together with sidewalls 14 and which is bent into the illustrated shape during the production of sidewalls 14.

Guide elements 38 are developed to correspond to guide mechanisms 32 of housing structure 12. In the illustrated case, guide hooks 40 of sidewalls 14 are developed in a fashion that corresponds to guide grooves 36 of housing structure 12. Guide projections 42 of sidewalls 14 are also developed to correspond to guide rails 34 of housing structure 12 in the illustrated case. This allows for a particularly stable attachment of sidewalls 14 to housing structure 12.

Figure 2:
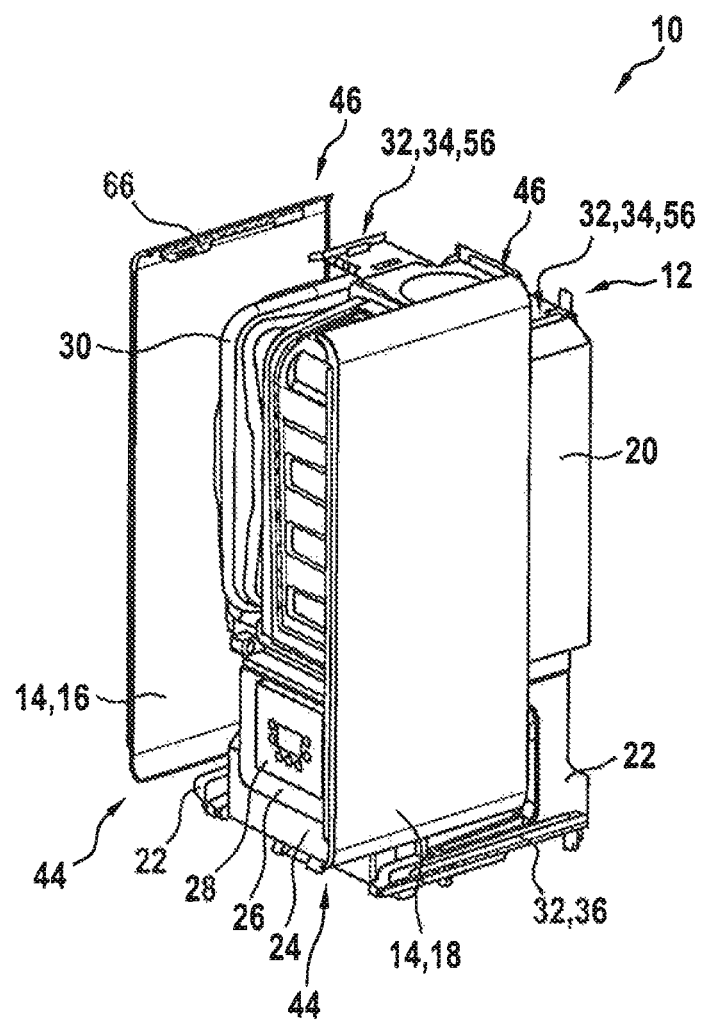
FIG. 2 shows a further perspective view of the housing structure from FIG. 1.

As previously mentioned, starting with FIG. 1, FIGS. 2 through 4 represent a sequence for the attachment of sidewalls 14 to housing structure 12. For example, FIG. 2 shows a further perspective view of housing structure 12 from FIG. 1 in which sidewalls 14 are situated closer to housing structure 12 than in FIG. 1 for the attachment.

Figure 3:
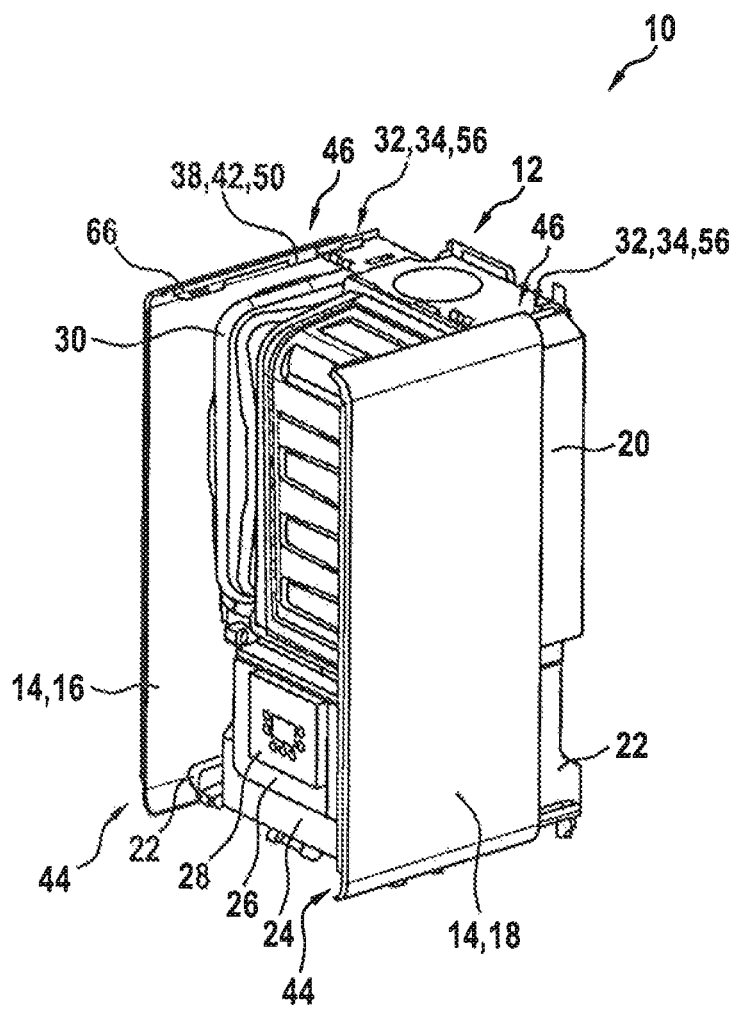
FIG. 3 shows a further perspective view of the housing structure from the preceding figures.

In the illustrated case, the sidewalls are now able to be hooked into the housing structure with the aid of guide mechanisms 32 and guide elements 38. FIG. 3 shows a further perspective view of housing structure 12 from the preceding figures in which sidewalls 14 are hooked into the housing structure. This is particularly clear when comparing FIG. 3 to FIG. 2.

Figure 4:
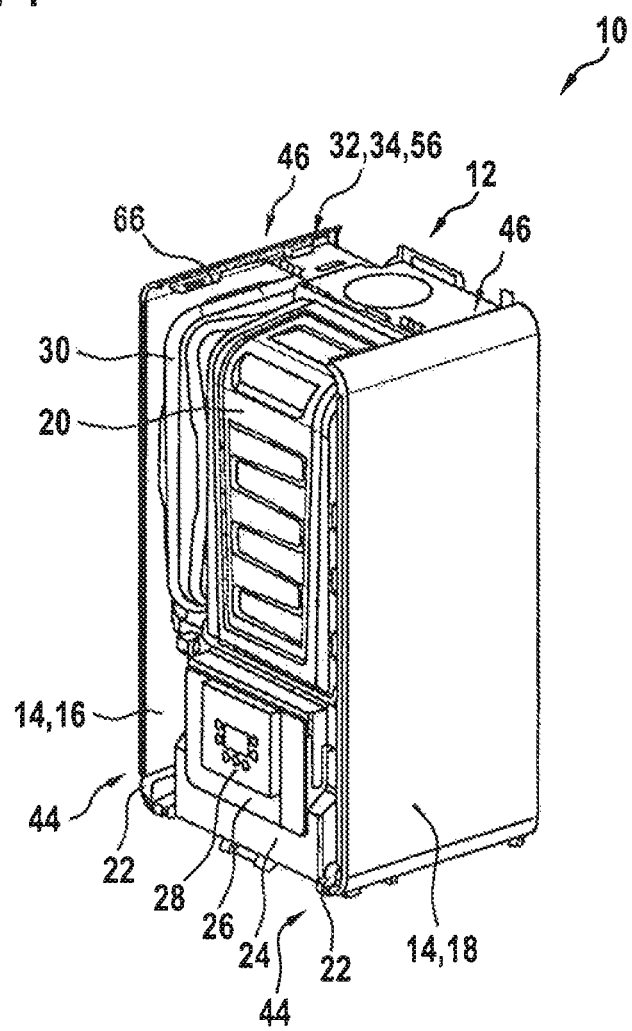
FIG. 4 shows a further perspective view of the housing structure from the preceding figures.

Next, sidewalls 14 are able to be slipped into the housing structure, also with the aid of guide mechanisms 32 and guide elements 38 in the illustrated case. In FIG. 4, a further perspective view of housing structure 12 from the preceding figures is shown, in which case sidewalls 14 are slipped onto the housing structure. This can be seen by comparing FIG. 4 to FIG. 3, in particular.

Accordingly, the present invention also relates to a method for mounting heating device 10. For instance, sidewalls 14 are attached to housing structure 12 in that sidewalls 14, with guide elements 38 in the illustrated case, are hooked into guide mechanisms 32 of housing structure 12 in a further method step, and then are inserted along guide mechanisms 32, with guide elements 38 in the illustrated case, in another method step.

Figure 5:
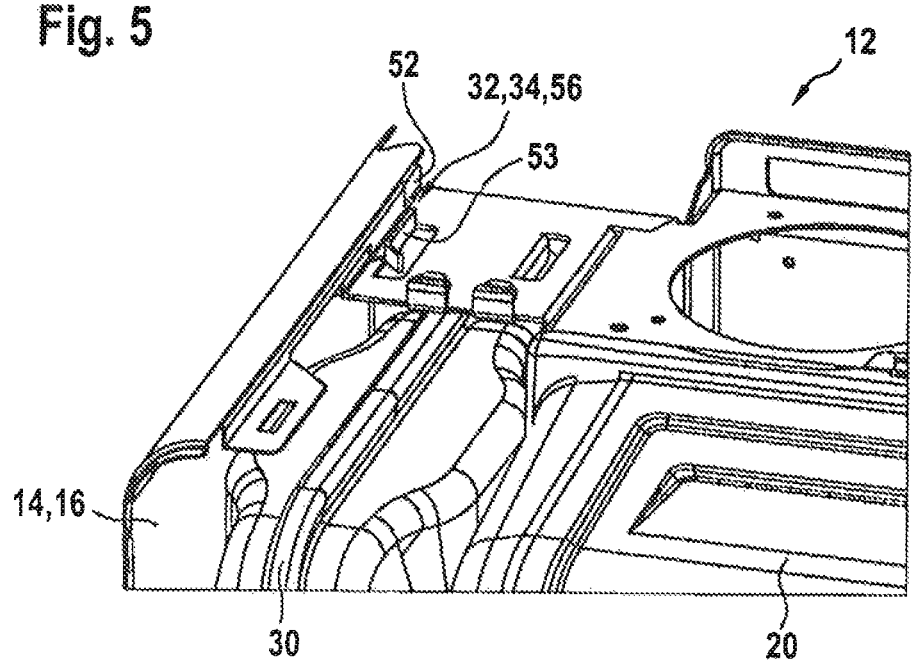
FIG. 5 shows a further perspective view of a guide mechanism of the housing structure from the preceding figures with an installed sidewall.

Accordingly, FIG. 5 shows an enlarged view of one of guide mechanisms 32 of housing structure 12 from the preceding figures with an installed sidewall 10, in the illustrated case, guide mechanism 34 with attached first sidewall 16. It is clear that guide rail 34 is developed in two parts. In the illustrated case, guide rail 34 is embodied by a first sheet-metal part 52 and a second sheet-metal part 54. First sheet-metal part 52 and second sheet-metal part 54 are developed parallel to each other and form a guide channel 56. Guide rail 34 may therefore also be understood as a guide channel 56. When sidewall 14 is attached, guide projection 42 of sidewall 14 engages with said guide channel 56, thereby producing a particularly stable attachment of sidewall 14 to housing structure 12.

Figure 6:
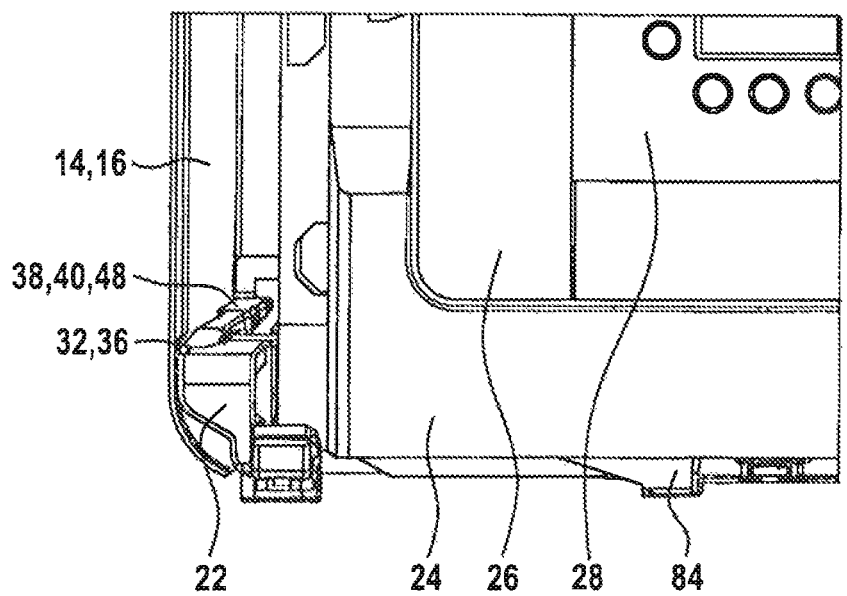
FIG. 6 shows an enlarged view of a further guide mechanism of the housing structure from the preceding figures with an installed sidewall.

Accordingly, FIG. 6 shows an enlarged view of one of guide mechanisms 32 of housing structure 12 from the previous figures with an attached sidewall 14, i.e. guide groove 36 with attached first sidewall 16 in the illustrated case. It is clear that guide hook 40 or U-shaped sheet-metal part 48 engages with guide groove 36. In the process, starting from sidewall 14 and up to guide groove 36, guide hook 40 encloses a portion of depicted structural element 22, so that sidewall 14 is also attached to housing structure 12 in an especially stable manner.

Figure 7:
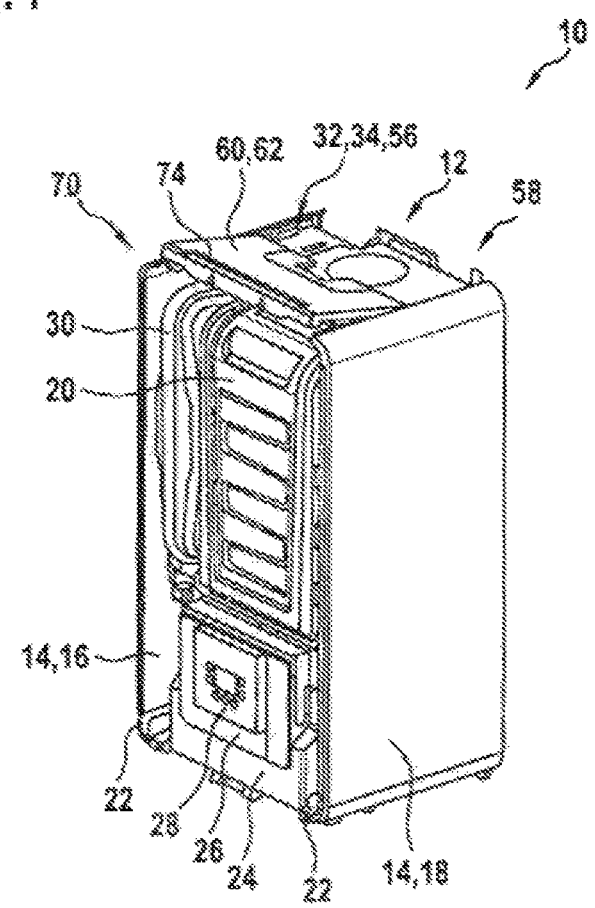
FIG. 7 shows a further perspective view of the housing structure from the preceding figures with the cover flipped open.

FIG. 7 shows another perspective view of the housing structure from the preceding figures. It can be seen that heating device 10 includes housing structure 12 and an external housing 58. The external housing has sidewalls 14 and a cover 60, which are able to be attached to housing structure 12. The main feature of heating device 10 is that cover 60 is developed for the positioning of the sidewalls in at least one direction in space, which is the insertion direction and/or the pullout direction of sidewalls 14 in the illustrated case, relative to housing structure 12. This allows for a particularly simple and precise attachment of sidewalls 14. Sidewalls 14 are aligned with respect to housing structure 12 so that the mounting of further housing parts is able to take place more easily.

In the illustrated case, cover 60 is also developed to position the two sidewalls 14 relative to each other, thereby likewise allowing for a particularly easy and precise mounting of sidewalls 14. This achieves a flush alignment of sidewalls 14 together with cover 60, in particular toward the front.

In the illustrated case, cover 60 may be mounted on housing structure 12 as a cover flap 62. Accordingly, FIG. 7 shows a further perspective view of housing structure 12 from the preceding figures with a cover 60 that is flipped open.

Figure 8:
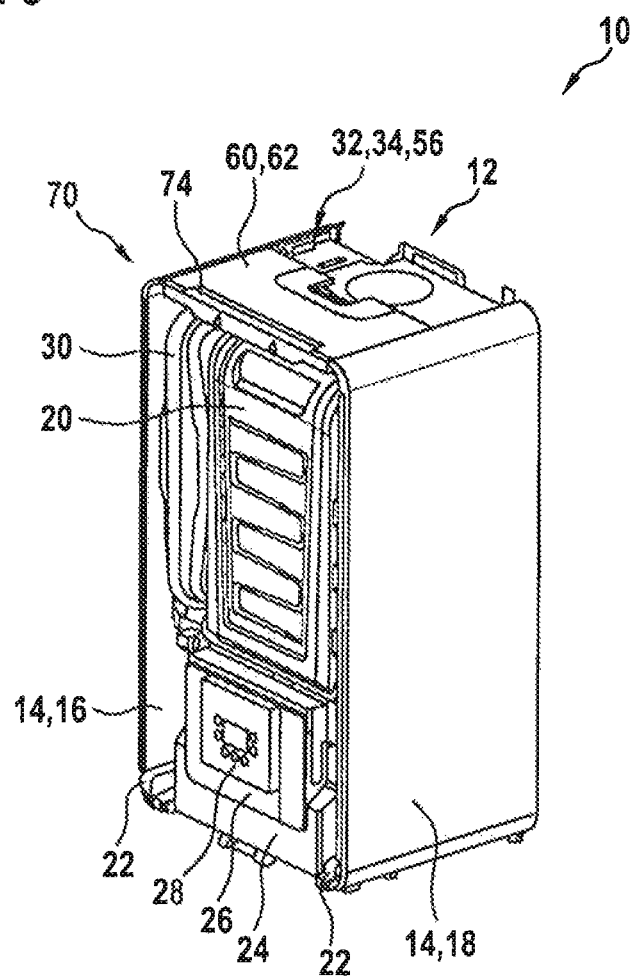
FIG. 8 shows a further perspective view of the housing structure from the preceding figures with the cover closed.

As already mentioned, the present invention relates to a method for mounting heating device 10. In the illustrated exemplary embodiment, sidewalls 14—as already described above—are mounted on housing structure 12 by at least one method step. In a further method step, sidewalls 14 are then positioned relative to housing structure 12 by attaching cover 60, which is done by closing cover flap 62 in the illustrated case. Accordingly, FIG. 8 shows housing structure 12 with a closed cover 60. In this way an uncomplicated and precise mounting of the sidewalls is able to be accomplished in a particularly rapid manner.

Figure 9:
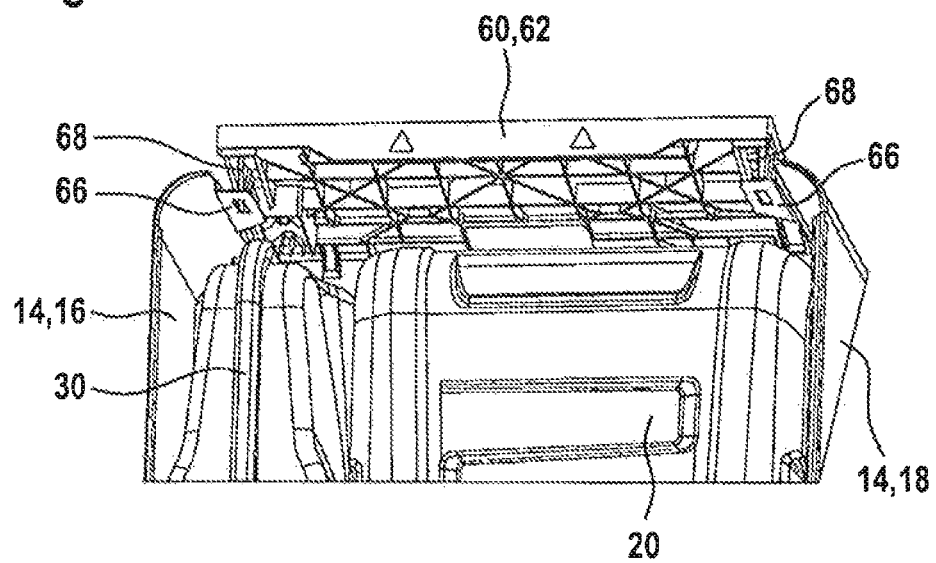
FIG. 9 shows an enlarged view of the housing structure from the preceding figures in the area of the cover.

FIG. 9 shows an enlarged view of housing structure 12 from the preceding figures in the area of cover 60, with a cover 60 that is flipped open. It can be seen that each sidewall 14 has a tab-like projection 66, and that cover 60 has a lug-type projection 66 that corresponds thereto.

Figure 10:
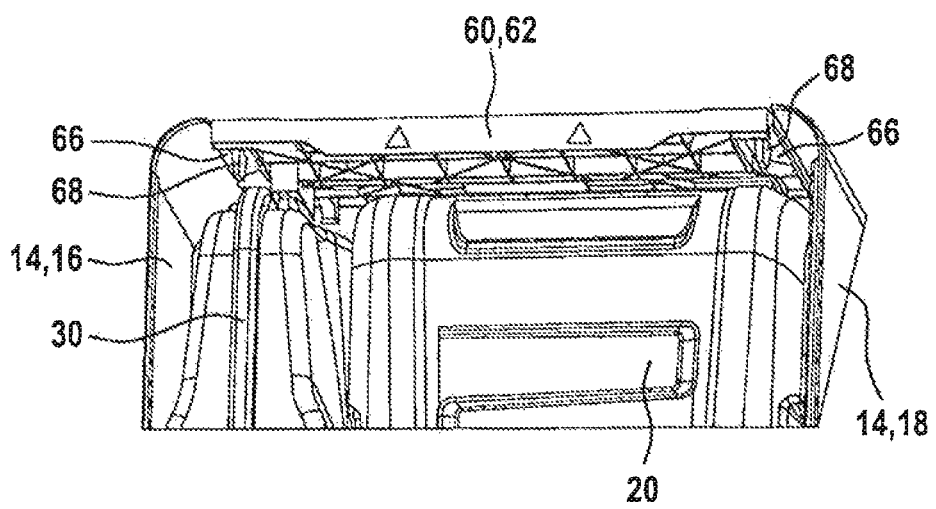
FIG. 10 shows a further enlarged view of the housing structure from the preceding figures in the area of the cover.

FIG. 10, in turn, shows an enlarged view of housing structure 12 from the preceding figures in the area of cover 60, with a closed cover 60. It can be seen that lug-type projections 68 of cover 60 engage with tab-like projections 66 of sidewalls 14 in order to position sidewalls 14, i.e. by closing cover 60 in the illustrated case. This makes it impossible to uninstall sidewalls 14 from housing structure 12 when cover 60 is closed.

Cover 60 not only positions sidewalls 14 but also holds them in position so that further shifting of sidewalls 14 is avoided.

Thus, no screwed and/or riveted connection is required in order to keep sidewalls 14 in place, further simplifying the attachment and saving costs.

Figure 11:
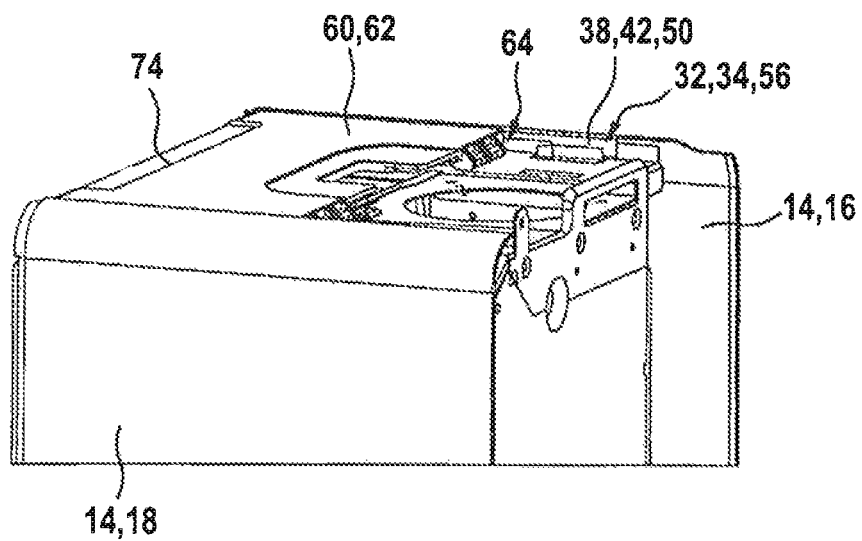
FIG. 11 shows a further enlarged view of the housing structure from the preceding figures in the area of the cover.

FIG. 11 shows an additional enlarged view of housing structure 12 from the preceding figures in the area of cover 60. Cover 60 or cover flap 62 is attached to housing structure 12 by a hinge-type connection 64, which allows for a particularly simple fastening of cover 60 to housing structure 12. In the illustrated case, hinge-type connections 64 are formed by hooking cover 60 into housing structure 12.

Accordingly, cover 60 is hooked into housing structure 12, i.e. from above in the illustrated case, and may then be flipped closed.

Together, cover 60 and sidewalls 14 at least essentially form external housing 70 of heating device 10.

In the illustrated exemplary embodiment, heating device 10 additionally has a front cover 72, which may be attached to cover 60. In the illustrated case, front cover 72 is able to be hooked into cover 60.

Figure 12:
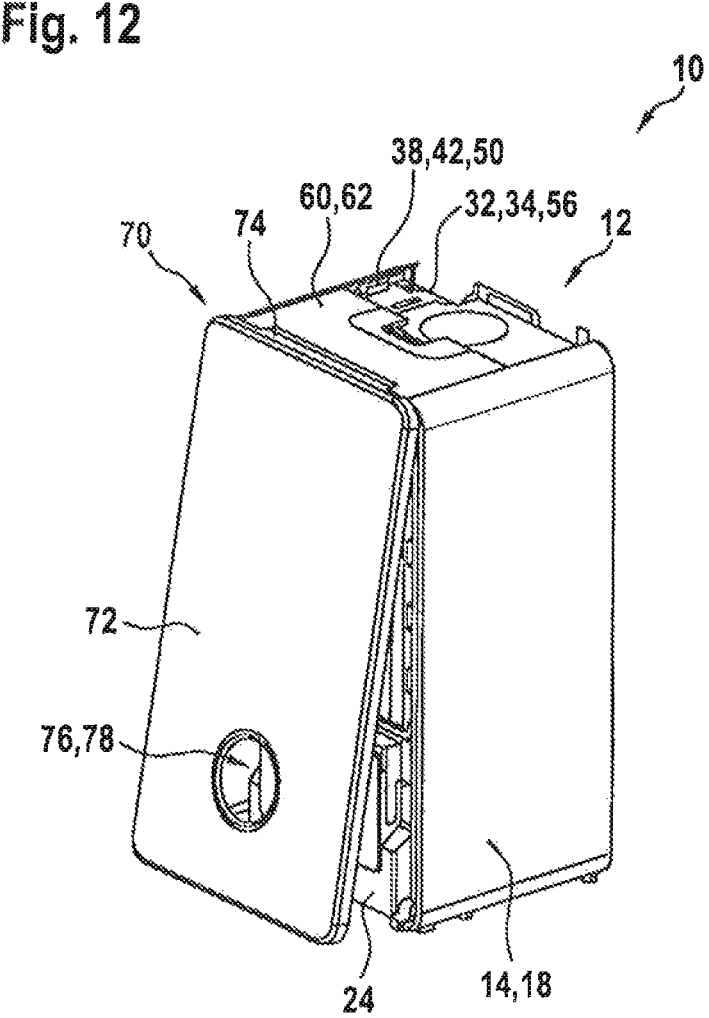
FIG. 12 shows a further perspective representation of the housing structure from the preceding figures with a partially mounted front cover.

FIG. 12 accordingly shows a further perspective view of housing structure 12 from the preceding figures together with a partially mounted front cover 72. In this illustration, it can be clearly seen that front cover 72 is hooked into cover 60. Cover 60 has a recess 74 (see also FIG. 7, 8 or 11) in which front cover 72 is hung.

In addition, it can be seen that front cover 72 includes a recess 76, which is provided to allow access to operating unit 28 of heating device 10. In the illustrated case, recess 76 is a circular opening 78.

Figure 13:
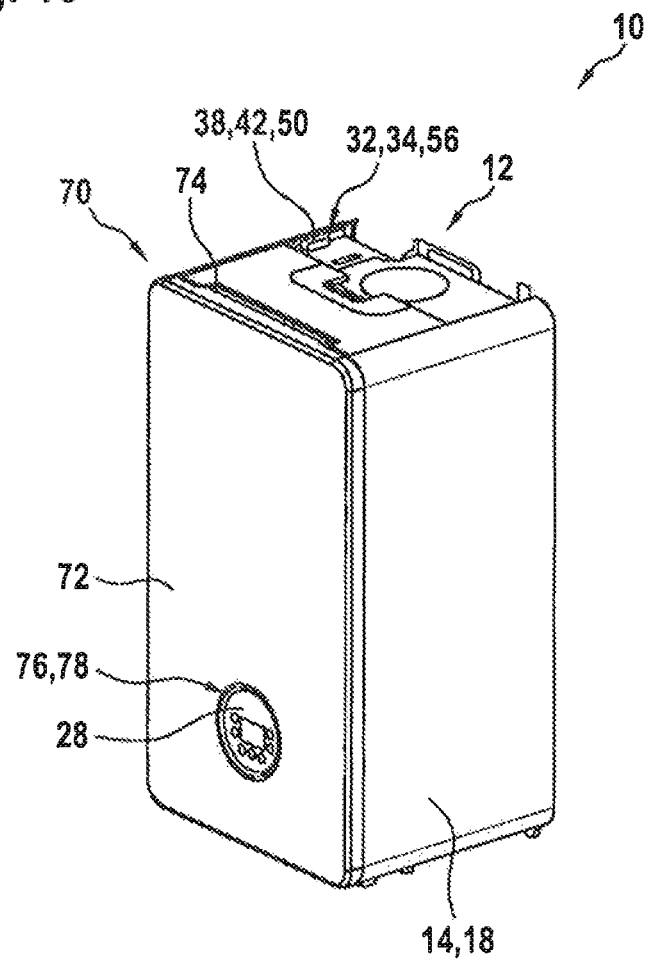
FIG. 13 shows a further perspective representation of the housing structure from the preceding figures with a fully mounted front cover.

Accordingly, a further perspective representation of housing structure 12 from the preceding figures together with front cover 72 is shown in FIG. 13, front cover 72 being fully mounted. It can be seen, for instance, that when front cover 72 is mounted, recess 76 is positioned on operating unit 28, thereby making operating unit 28 accessible to a user.

Figure 14:
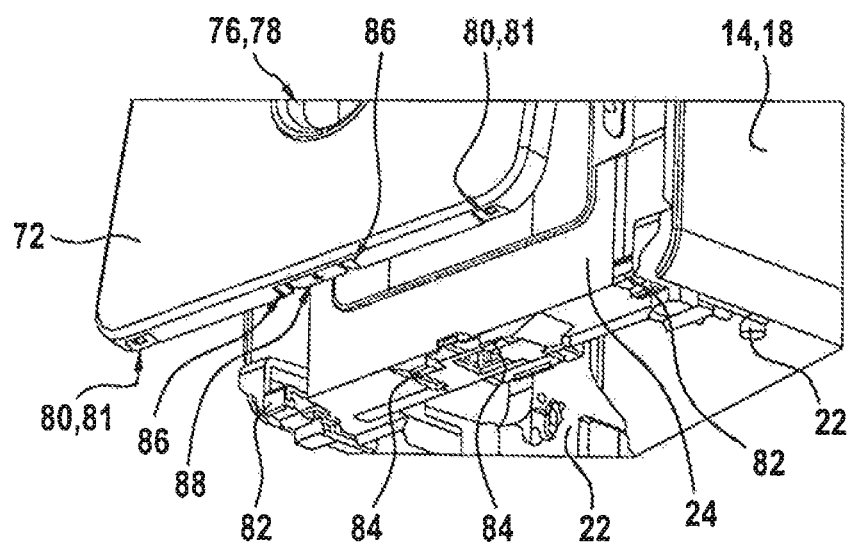
FIG. 14 shows an enlarged representation of the housing structure from the preceding figures, from below, with a partially mounted front cover.
Figure 15:
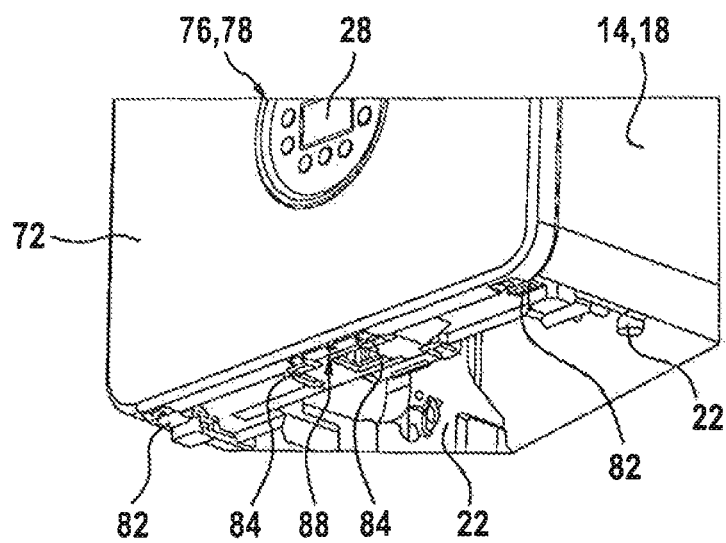
FIG. 15 shows an enlarged representation of the housing structure from the preceding figures with a fully installed front cover from below.

FIG. 14 shows an enlarged representation of housing structure 12 from the preceding figures with a partially mounted front cover 72, from below, while FIG. 15 shows an enlarged representation according to FIG. 14 with a fully mounted front cover 72. FIG. 14 and FIG. 15 illustrate that front cover 72 has additional recesses 80, which are developed to hold front cover 72 in place.

In the illustrated case, further recesses 80 are additional openings 81, which are developed to correspond to detent elements 82 that are mounted on structural elements 22. When front cover 72 is secured in place, detent elements 82 snap into corresponding further recesses 80. If necessary, the fixation of front cover 72 is able to be reversed again by an operation of detent elements 82, and front cover 72 is able to be taken off or unhooked from cover 60.

In addition, it can be gathered from FIG. 14 and FIG. 15 that holding device 24 has projections 84 for positioning front cover 72. Projections 84 position front cover 72 both in the horizontal direction and in the vertical direction, which simplifies the mounting of front cover 72 and simultaneously ensures that recess 72 for the accessibility of operating unit 28 is always positioned at the correct location on operating unit 28.

Projections 84 for positioning front cover 72 are developed in an L-shape. Front cover 72, in turn, has recesses 86 with which projections 84 engage for the positioning. Because of the L-shaped embodiment of projections 84, it is possible to position front cover 72 in the horizontal and vertical direction. The engagement of the projections in recesses 86 achieves the positioning of front cover 72 in the horizontal direction, while the positioning of front cover 72 in the vertical direction is achieved by placing front cover 72 on projections 84.

In addition, front cover 72 has a bore hole 88 by which front cover 72 is able to be attached to holding device 24, e.g., by a screwed connection, so that front cover 72 is able to be securely fixed in place in addition.

When front cover 72 is mounted, it is impossible to open cover 60, which therefore also makes it impossible to remove sidewalls 14, as described earlier. As a result, external housing 70 is able to be locked by the fixation of front cover 72.

In the event that front cover 72 is secured in place by bore hole 88 with the aid of a screwed connection, a technician simply has to undo the screwed connection in order to be able to remove the front cover by operating detent elements 82. This provides a secure fixation of the external housing while allowing easier access by a technician, for instance for service or repair work.

What is claimed is:

1. A heating device, comprising:
   a housing structure; and
   an external housing having at least one sidewall and at least one cover, which are able to be fixed in place on the housing structure, wherein the at least one cover is designed to position the at least one sidewall in at least one direction in space relative to the housing structure,
   wherein the at least one cover is configured on the housing structure as a cover flap and is configured to attach to the housing structure via at least one hinge-type connection via hooking the at least one cover into the housing structure from above,
   wherein the cover has a first recess in which the front cover is hung, and the front cover includes a second recess configured to allow access to an operating unit of the heating device.

2. The heating device as recited in claim 1, wherein the heating device is a gas-heating system.

3. The heating device as recited in claim 1, wherein at least one of: (i) the housing structure includes at least one guide mechanism, and (ii) the at least one sidewall includes at least one guide element.

4. The heating device as recited in claim 1, wherein the housing structure includes at least one guide mechanism, and the at least one sidewall includes at least one guide element that corresponds to the at least one guide mechanism of the housing structure.

5. The heating device as recited in claim 3, wherein the at least one sidewall is able to be fixed in place on the housing structure with the aid of the at least one of the at least one guide mechanism and the at least one guide element, by at least one of hanging and insertion.

6. The heating device as recited in claim 1, wherein the at least one sidewall has a tab-like projection, and the at least one cover has a lug-type projection that corresponds thereto and which engages with the tab-like projection to position the at least one sidewall.

7. The heating device as recited in claim 1, wherein the external housing has at least two sidewalls, and the at least one cover is designed to position the at least two sidewalls relative to each other.

8. The heating device as recited in claim 1, wherein the external housing has at least one front cover, which is able to be hung on the at least one cover.

9. A method for mounting a heating device, comprising:
   a) attaching at least one sidewall to a housing structure; and
   b) positioning the at least one sidewall relative to the housing structure by mounting and closing a cover flap to close a cover from above and then flipping the cover closed,
   wherein step a) is carried out by at least one of the following method steps:
   c) hanging the at least one sidewall into at least one guide mechanism of the housing structure, or
   d) inserting the at least one sidewall along at least one guide mechanism of the housing structure, and
   e) hooking at least one front cover on or into the at least one cover from above.

\* \* \* \* \*